Nov. 13, 1962   B. HOWARD   3,063,540
TELEGRAPH PRINTER
Filed Oct. 20, 1960   5 Sheets-Sheet 1
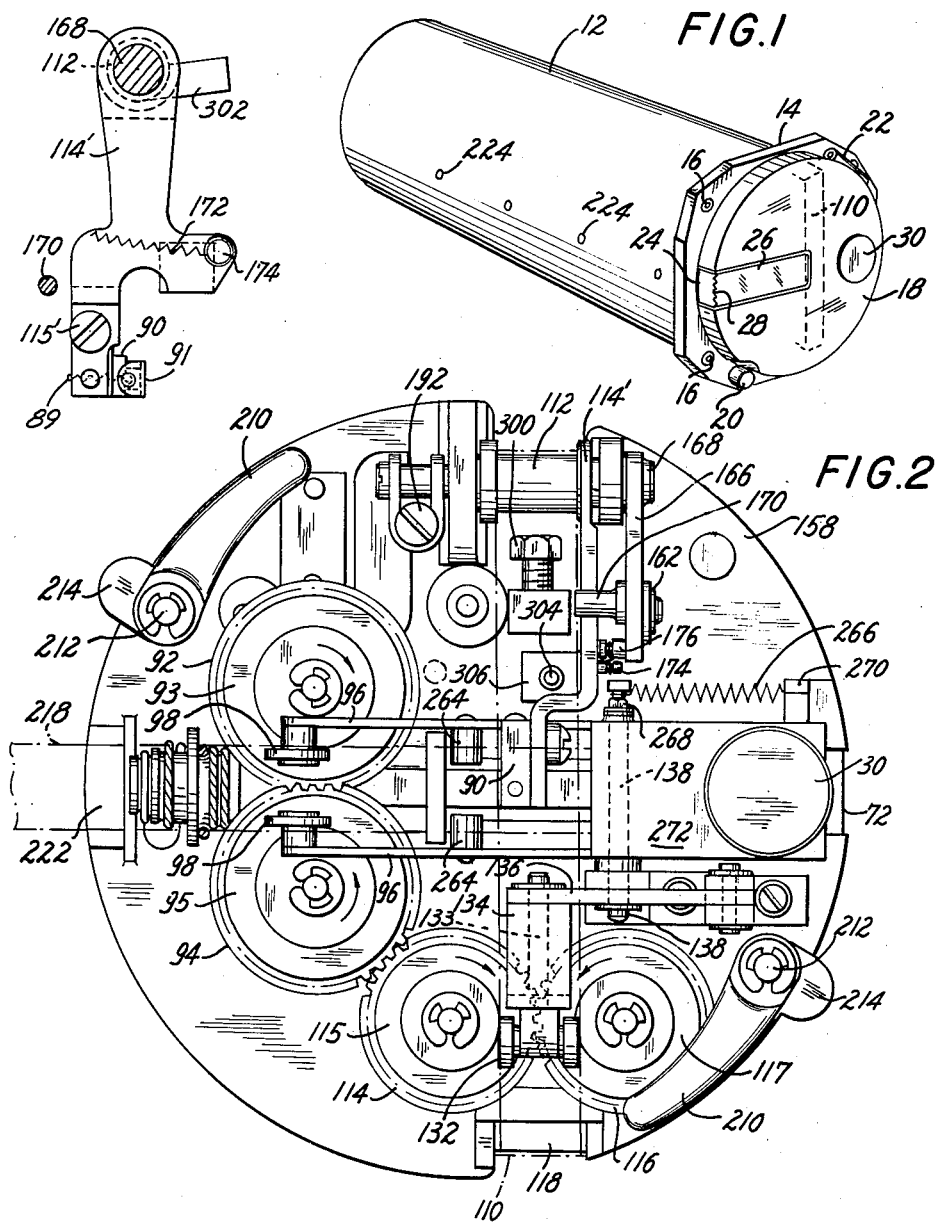
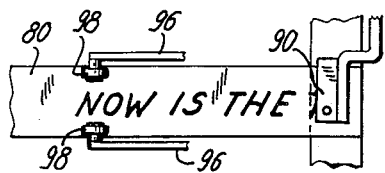
INVENTOR.
BERNARD HOWARD
BY *James and Franklin*
ATTORNEYS

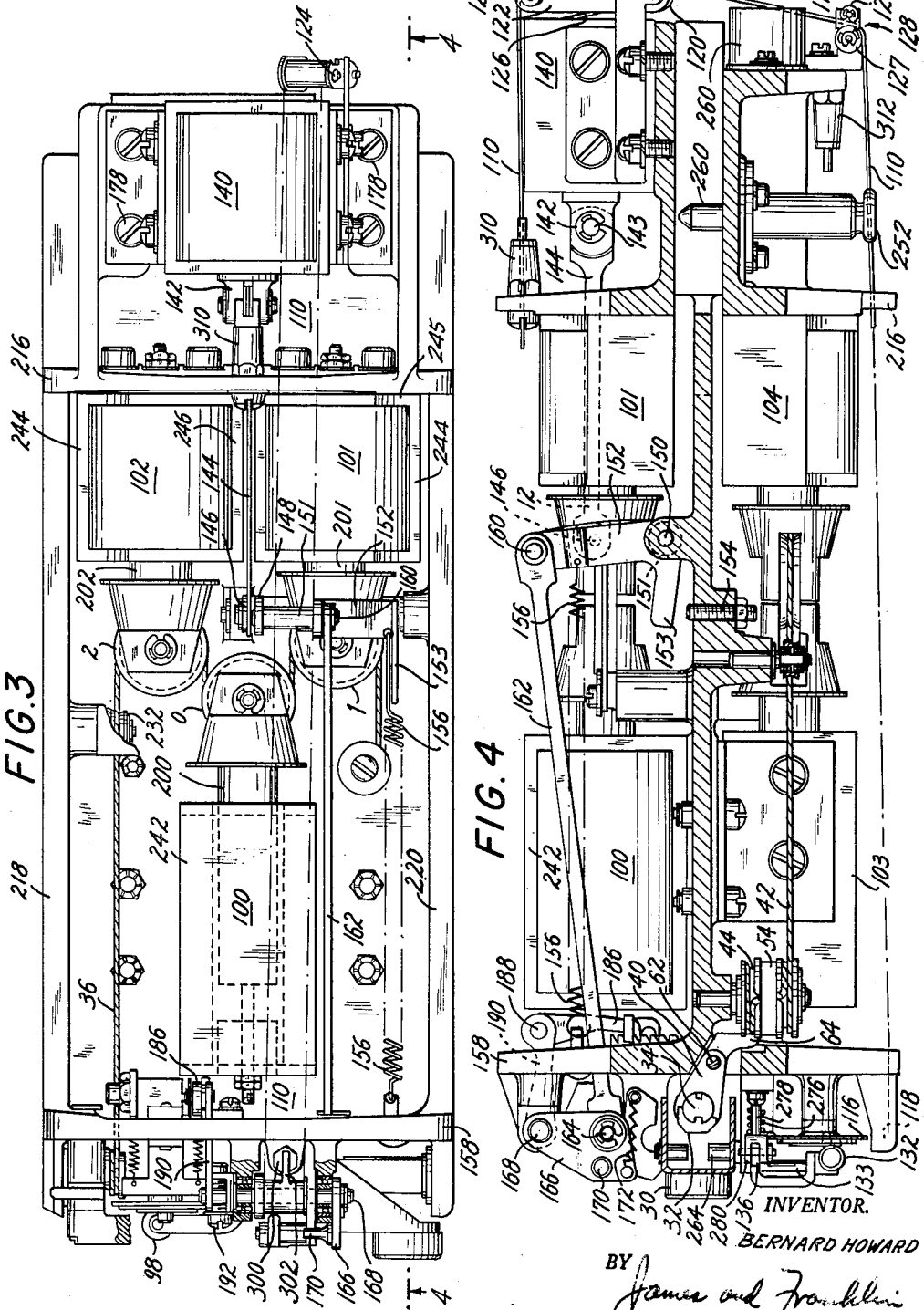

Nov. 13, 1962  B. HOWARD  3,063,540
TELEGRAPH PRINTER
Filed Oct. 20, 1960  5 Sheets-Sheet 3

INVENTOR.
BERNARD HOWARD
BY James and Franklin
ATTORNEYS

Nov. 13, 1962

B. HOWARD 3,063,540

TELEGRAPH PRINTER

Filed Oct. 20, 1960

INVENTOR.
BERNARD HOWARD

BY *James and Franklin*

ATTORNEYS

Nov. 13, 1962  B. HOWARD  3,063,540
TELEGRAPH PRINTER
Filed Oct. 20, 1960  5 Sheets—Sheet 5
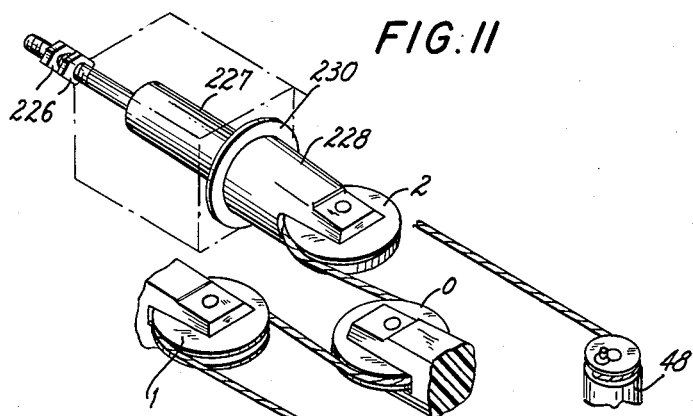
FIG. 11
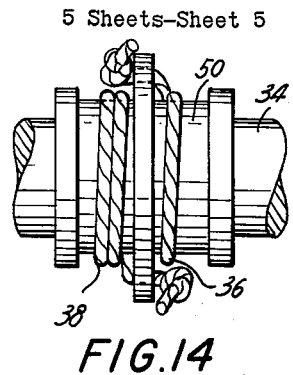
FIG. 14
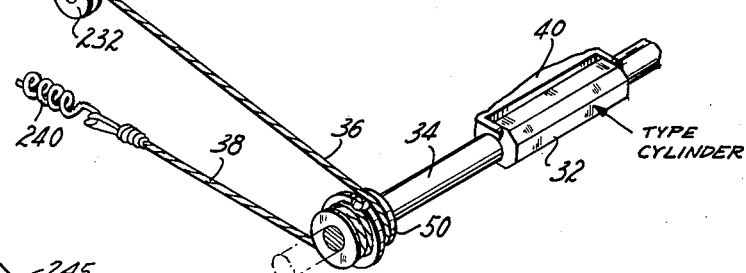
FIG. 13
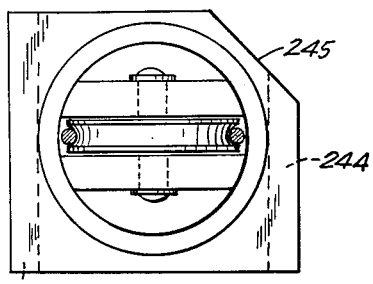
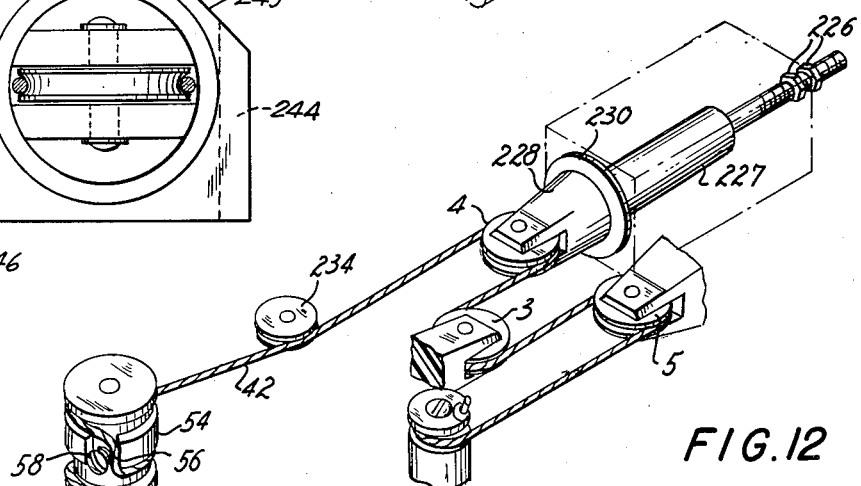
FIG. 12
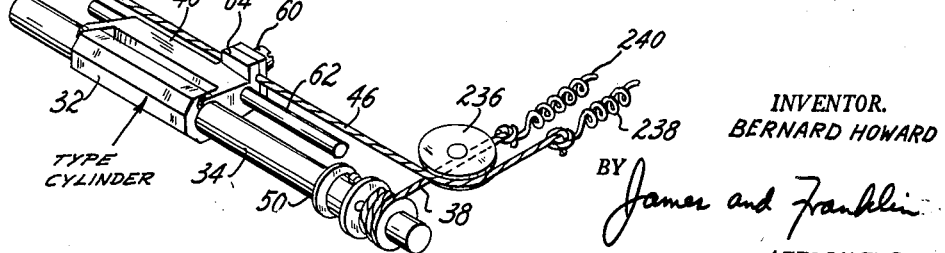
INVENTOR.
BERNARD HOWARD
BY James and Franklin
ATTORNEYS

United States Patent Office 3,063,540
Patented Nov. 13, 1962

3,063,540
TELEGRAPH PRINTER
Bernard Howard, Upper Saddle River, N.J., assignor, by mesne assignments, to Mite Corporation, New Haven, Conn., a corporation of Delaware
Filed Oct. 20, 1960, Ser. No. 63,739
24 Claims. (Cl. 197—49)

This invention relates to telegraph printers, and more particularly to a compact light-weight telegraph printer.

The general object of the present invention is to improve telegraph printers, particularly with a view to making the same exceedingly small in dimension from top to bottom and from side to side, thereby adapting the same for insertion through a standard instrument-panel hole in an aircraft instrument panel. For this purpose the printer is so compactly designed that it is housed in a cylindrical casing only 3⅛ inches in diameter. This result is preferably accomplished by optimum disposition and placement of relatively rugged parts, rather than by mere miniaturization with consequent weakness.

The printer is designed to print on a narrow lightweight paper tape, and in accordance with further objects of the invention it is designed to receive a large diameter roll of tape, despite the small size of the printer; the tape is pulled at a point beyond the printing mechanism, and yet the printed message, including the last character printed, is exposed for immediate reading; the feed mechanism is compact in the fore and aft direction of the printer, so that the tape may be located at and withdrawn from the printer at the front face of the printer; and the feed means is driven from the print hammer with a minimum of additional mechanism.

Further objects center about the ink ribbon, and are to provide compact feed mechanism for the ink ribbon; to gear said feed mechanism directly to the paper tape feed mechanism, thereby eliminating duplicate drive mechanism; to eliminate ribbon supply and take-up spools by utilizing an endless band of ribbon; and to provide for re-inking the ribbon.

Other objects concern the cable and pulley system for character selection, and are to provide a compact arrangement for solenoids disposed lengthwise of the printer; to provide groups of solenoids above and below a diametrical plane in which plane a tape roll of maximum diameter is received; and to employ return springs which are simple pull springs, and yet which function well because they are made substantial in length, which in turn is made feasible by disposing the same longitudinally of the printer. For the same general purpose the hammer actuating solenoid and linkage and return spring are also disposed longitudinally of the printer, and electrical connection is made by means of a detachable connector at the rear end of the printer.

To accomplish the foregoing objects, and other more specific objects which will hereinafter appear, my invention resides in the telegraph printer elements and their relation one to another, as are hereinafter more particularly described in the following specification. The specification is accompanied by drawings in which:

FIG. 1 is a perspective view showing the printer in its cylindrical case;

FIG. 2 is a front view of the printer mechanism removed from its case;

Figure 5:
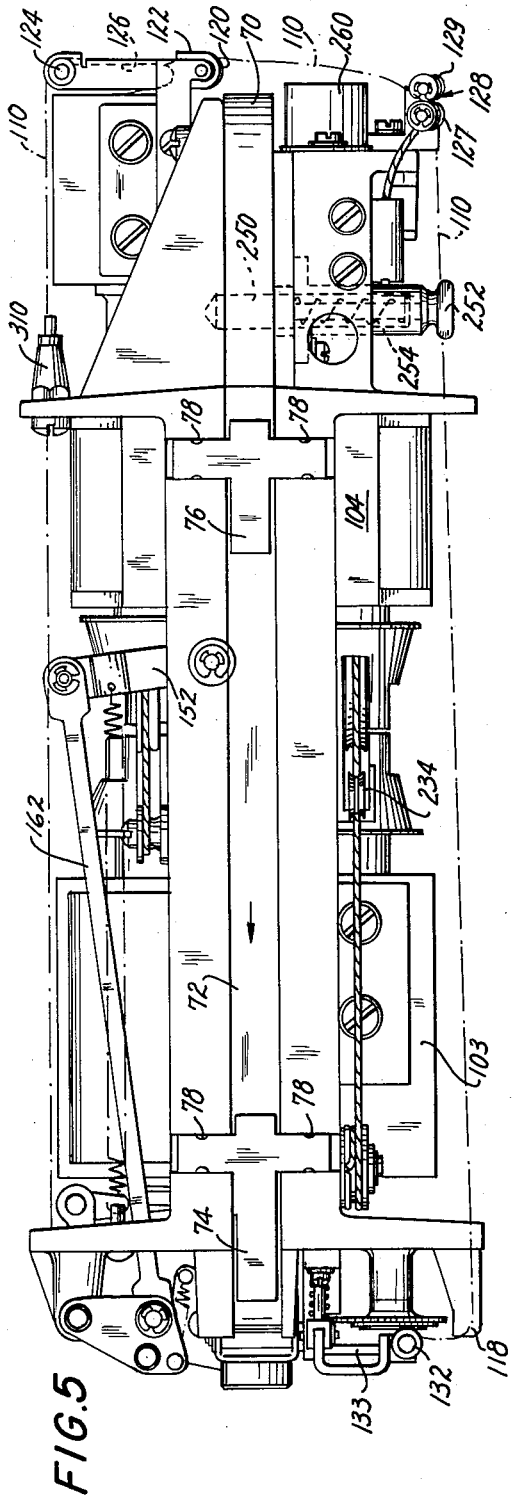
Figure 6:
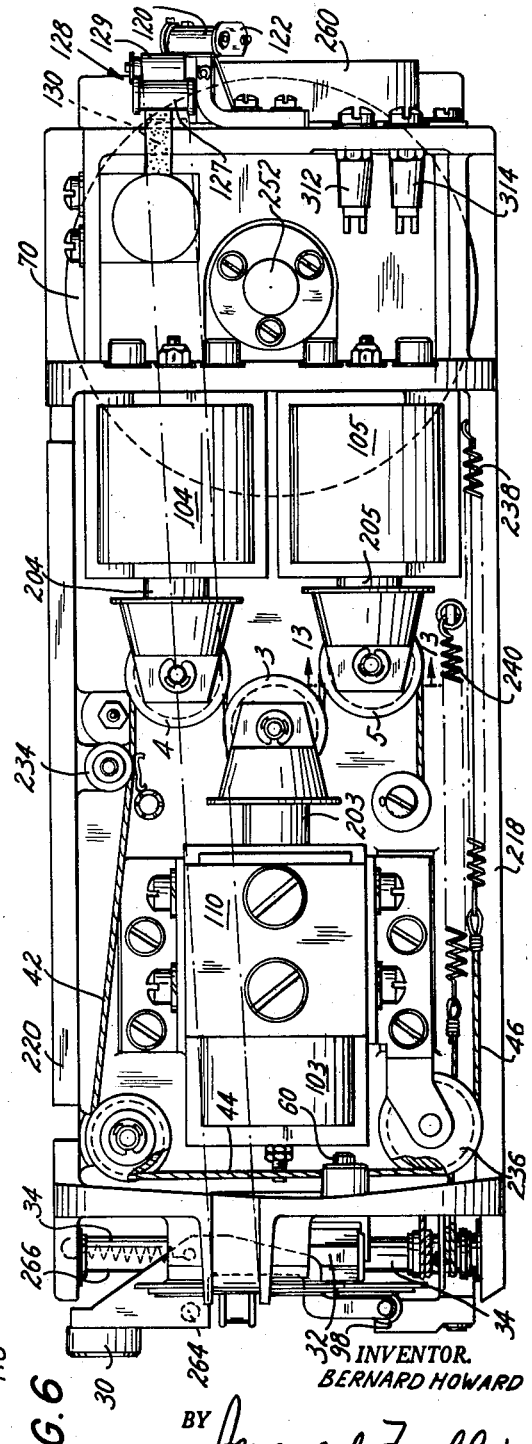
Figure 7:
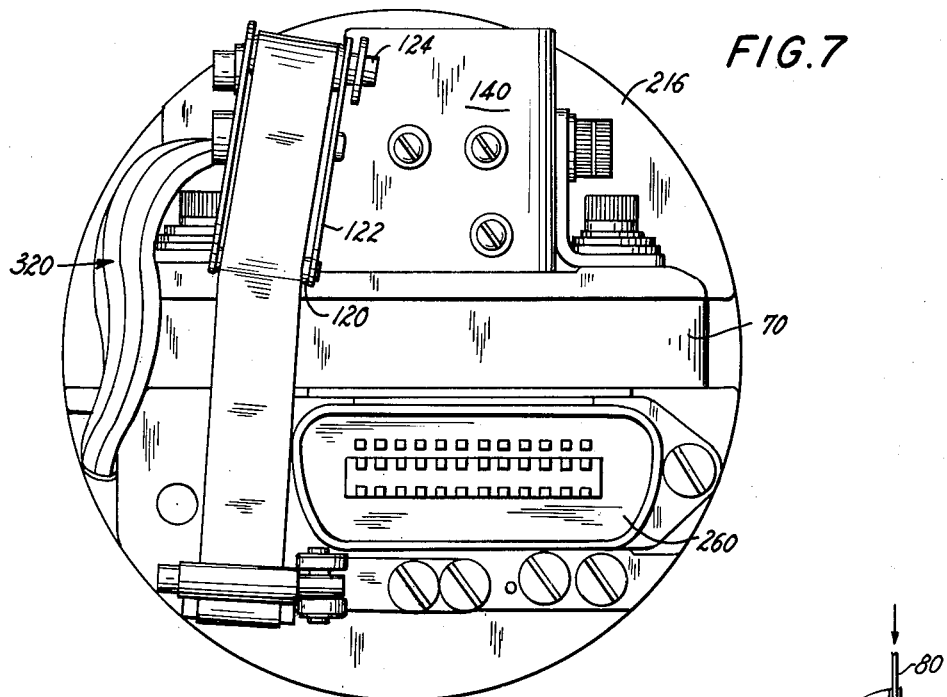
Figure 8:
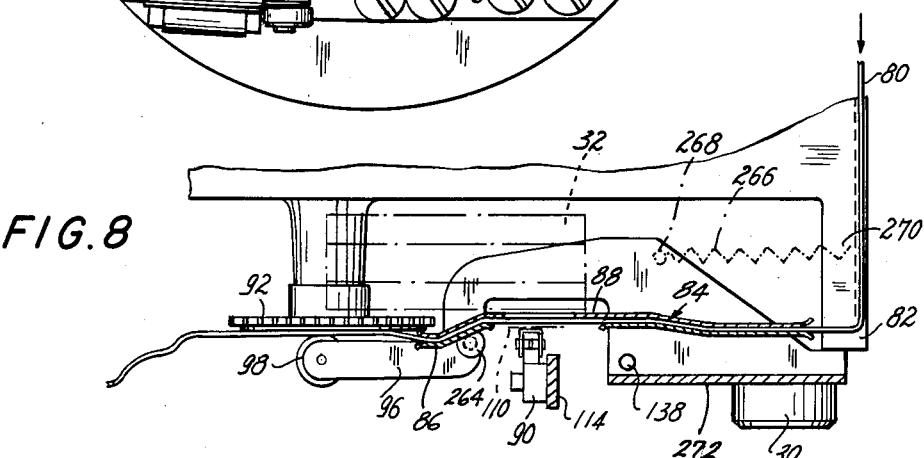
Figure 9:
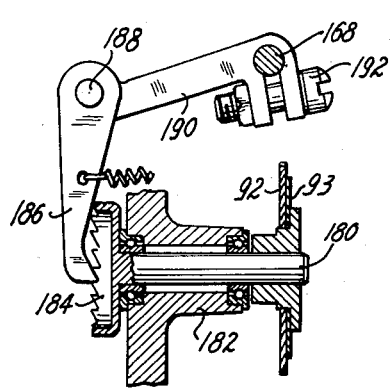
Figure 10:
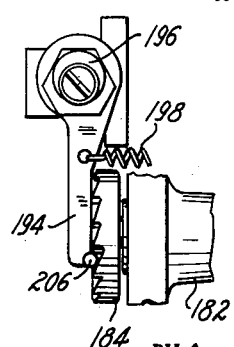

FIG. 2–A is a fragmentary vertical elevation showing the print hammer;

FIG. 2–B shows how the message is exposed as it is being printed;

FIG. 3 is a plan view of the printer;

FIG. 4 is a vertical section taken approximately in the plane of the line 4—4 of FIG. 3;

FIG. 5 is a side elevation of the printer, looking in the same direction as FIG. 4;

FIG. 6 is a bottom view of the printer;

FIG. 7 is a rear end view;

FIG. 8 is a fragmentary view explanatory of a part of the paper feed mechanism;

FIG. 9 is a fragmentary vertical section showing a pawl and ratchet forming a part of the tape feed mechanism;

FIG. 10 is a fragmentary vertical elevation showing a spring detent forming a part of the tape feed mechanism;

FIG. 11 is a perspective view showing the cable and pulley arrangement for rotary character selection;

FIG. 12 is a perspective view looking toward the bottom of the printer, that is with the printer inverted, and showing the pulley and cable system for lateral (axial) character selection;

FIG. 13 is an end view of a solenoid; and

FIG. 14 is an enlarged fragmentary view showing the cable drum for rotary character selection.

Referring to the drawings, and more particularly to FIG. 1, the printer is received and housed in a cylindrical casing 12 having a diameter of 3⅛ inches, and thereby adapted to be received in the standard instrument hole of an airborne instrument panel. The cylindrical casing is terminated at its forward end by a generally square flange 14, which is 3¼ inches from edge to edge, and the said flange is secured to the panel (not shown), as by means of mounting screws at 16. The flange 14 carries a cover 18 which may be released by removing a screw 20, and which then may be turned outward on a hinge 22, thereby exposing the printer mechanism for servicing or for removal.

The cover 18 has an edge slot at 24 for discharge of the printed tape, and the printed matter thereon is further exposed through a transparent window 26. The edge of the window may be serrated at 28 to act as a tear edge for tearing lengths of tape from the printer at the end of a message. A push button 30 projects through the cover, and may be pressed to release the tape so that a length of clear tape may be pulled to the edge 28 before tearing the tape.

Referring now to FIGS. 11 and 12, in some respects the printer resembles that shown in my Patent Number 2,727,944, issued December 20, 1955, and my Patent Number 2,769,029, issued October 30, 1956, in that it employs a "cylindrical" or prismatic type body 32 which is both rotatable and movable axially for character selection. For this purpose it is slidable on a splined shaft 34, and the latter is rotated by a cable 36 (FIG. 11) against the resistance of a restoring cable 38. For lateral or axial movement the type body is carried between the forked arms of a yoke 40 (FIG. 12), and the latter is moved by cables 42, 44, and 46. It is slidable on a guide rod 62.

In FIG. 11 one end of the cable is fixed on a stationary post 48. The cable is then threaded reversely around movable selector pulleys here marked 2, 0, and 1. The pulleys are mounted on solenoid cores for movement to either of two positions, and their displacement differs in multiples. In the present case pulley #2 moves 1/16 inch; pulley #1 moves 1/8 inch; and pulley 0 moves 1/4 inch. Different combinations of these positions provide eight positions, and the cable drum 50 has a diameter such that each increment turns the shaft 1/8 revolution. This is for use with a type body 32 which has eight faces as here shown. Cables 36 and 38 are wound in opposite direction around their adjacent drums, as will be seen also in FIG. 14.

A generally similar pulley system provides eight positions of axial movement of the type body, the said type body being eight characters long. In FIG. 12 the pulleys 3, 4, and 5 have respective solenoid core movements of 1/4 inch, 1/8 inch, and 1/16 inch. In FIG. 12 one end of cable 42 is fixed on a stationary post 52. To change from a lower to a higher level (keeping in mind that FIG. 12 shows the system inverted), a transfer pulley 54 is employed. For this purpose cables 42 and 44 could be separate, with their ends wrapped around and secured to the transfer pulley, but it is convenient to use a single continuous cable, an intermediate or connecting part 56 of which extends from one level to the other, and may be secured to the transfer pulley by means of a clamp screw 58.

Cable 44 is secured to yoke 40 by means of a clamp screw 60, and the end of return cable 46 is similarly attached. In practice these may be a single continuous cable as here shown, which cable is clamped to the yoke 40 by means of a clamp plate and screw 60.

Referring now to FIG. 4, one end of the type cylinder is seen at 32, slidable on splined shaft 34, and moved by yoke 40, which is itself additionally guided on rod 62, and having a depending part 64 to which the cable 44 is clamped. The transfer pulley 54 and cable 42 are also shown in this figure.

Referring now to FIG. 6, which is a bottom view, cable 42, 44, 46 moves the print cylinder 32 axially on shaft 34 extending diametrically across the front of the printer. Referring next to FIG. 3, a second cable 36 rotates the splined shaft. The three solenoids 100, 101, and 102 are disposed longitudinally of the printer, in the upper half of the printer. The solenoids have cores 200, 201, and 202 which carry the pulleys 0, 1, and 2, with the middle solenoid 100 directed oppositely to the solenoids 101 and 102. The lateral location of the solenoids is so related to the diameter of the pulleys that the back and forth passes of the cable are parallel.

In FIG. 6 it will be seen that the solenoids 103, 104, and 105 with their cores 203, 204, and 205 for the pulleys 3, 4, and 5, are similarly arranged longitudinally of the printer, with alternate solenoids opposite in direction, but these three solenoids are located in the lower part of the printer. Referring next to FIGS. 4 and 5, these two groups of solenoids are somewhat spaced apart vertically, thereby providing a horizontal space between the upper and lower decks, in which space a large diameter tape roll 70 (FIG. 5) is located. The tape roll is located diametrically of the printer, and therefore may have a diameter of a full three inches, even though the diameter of the entire printer is only about three inches. The tape roll turns on a vertical axis.

Referring now to FIG. 5, the paper tape from roll 70 is guided through a shallow channel or paper guide groove 72. It is somewhat restrained frictionally by resilient hold-down tabs 74 and 76, the cross arms of which are staked in position in cross grooves, as indicated at 78, and the spring arms or tabs 74 and 76 of which are received in the guide groove 72. The paper is thus led forward all the way from the back end to the front end of the printer.

Referring now to FIG. 8, the paper tape 80 is turned at 82 and is led through a paper guide 84, and another paper guide 86, on opposite sides of a print hammer 90 disposed in front of the type cylinder, the latter being indicated in broken lines at 82. The rear plates of guides 84 and 86 may be joined, as shown at 88, but in such case the part 88 is windowed or apertured to freely pass the hammer 90. An ink ribbon 110 is located between the hammer 90 and the tape.

Referring now to FIG. 2, in order to pull the paper tape horizontally across the print means there are two feed wheels 92 and 94, which are geared together. These have frictional surfaces 93 and 95 located immediately behind the tape. There are also pressure fingers 96 carrying small rollers 98 bearing resiliently against the upper and lower edges of the tape to urge the same into contact with the frictional face surfaces 93 and 95. This is done without concealing the characters just printed on the front of the tape as will be seen in FIG. 2–B, in which the arms 96 and rollers 98 straddle and therefore do not conceal the printing on the tape 80.

It will be understood that the feed wheels 92 and 94 are gears which mesh directly together, and which therefore rotate in opposite direction, as they should, and as is indicated by the arrows in FIG. 2. As will be seen in FIGS. 8 and 9, the gears and their frictional surfaces may be thin, and therefore require little space and add little to the fore-and-aft dimension of the printer at its forward end.

Reverting to FIG. 1, the ink ribbon 110 extends down the front of the printer, and crosses the paper tape, as is indicated in broken lines. Reverting to FIG. 2, the ribbon is fed downward over a polished round surface 112, which serves another function in acting as a hub for the hammer arm 114′. The ribbon passes downward behind the hammer 90 to feed mechanism 114, 116 (FIG. 2) and thence to another rounded and polished guide 118, where the ribbon turns rearward beneath the printer. There are no supply and take-up spools, and instead the ribbon is an endless band passing entirely around the printer from front to back. The location of the ribbon is indicated largely in broken lines at 110 in FIGS. 3, 4, 5, and 6. The ribbon mechanism includes a take-up roller at 120, this being carried by arms 122 pivoted at 124 and resiliently urged outward by a bent wire spring 126. The pivot 124 acts also as a direction-turning pulley for the ribbon.

The ribbon is provided with re-inking means shown at 128 (FIGS. 4 and 5). This comprises a felt or other absorbent wick impregnated by the occasional addition of a few drops of ink, and a transfer roll 127 which runs in contact with the wick and the ribbon to transfer some of the ink to the ribbon. Another roll 129 acts as a pressure roll on the opposite side of the ribbon. The ribbon is preferably made of nylon, and the ink used is one especially adapted for use with a woven nylon ribbon. In FIG. 6 the wick is shown at 130.

Reverting now to FIG. 2, the ink ribbon feed means preferably comprises two feed wheels 114 and 116 geared directly together, and having frictional material 115 and 117 on their faces to engage the ribbon. There is also a pressure means, preferably rollers 132, to bear resiliently against the ribbon to hold the same against the frictional material 115 and 117. The rollers 132 are carried on a depending support 134 mounted at one end of a lever 136 pivoted at 138.

The feed wheels for tape and ribbon are geared to one another for simultaneous rotation of all four wheels. In the particular arrangement here shown the gear 94 meshes directly with the gear 114, and it will be observed from the direction of the arrows that all four wheels rotate in proper direction to pull the tape to the left, and to pull the ink ribbon downward.

The print hammer is operated by a solenoid, and the feed mechanism is operated by the print hammer. Referring to FIG. 3, the hammer solenoid is shown at 140.

It is located on the upper deck, longitudinally of the printer, and behind the solenoids 102, 101. Its core 142 is pivotally connected at 143 (FIG. 4) to a thin flat link 144 extending longitudinally through the narrow space between the solenoids. At its forward end it is pivotally connected at 146 (FIG. 4) to a generally upright double arm pivoted on the machine frame at 150. A double arm is used in order to straddle the pulley block of solenoid 101. It is made up of spaced arms 148 and 152, widely spaced at their lower ends at pivot 150. Arm 152 is bent inward, bringing the arms closer together at their upper ends, where they are rigidly connected by a spacer 151 (FIG. 3).

Arm 152 has a stop portion 153 which bears against a threaded adjustable stop 154 to limit the return movement of the linkage under the influence of a long return spring 156, the rear end of which is connected to arm 152, and the forward end of which is connected to a stud on the front wall 158 of the machine frame. The upper end of arm 152 is rigidly connected to arm 148, and is pivoted at 160 to a forwardly extending link 162, the forward end of which is pivotally connected at 164 to a hammer actuator plate 166. This is pivoted at 168, and has a sidewardly projecting stud at 170 for bearing against the hammer arm (114' in FIG. 2).

Referring now to FIG. 2–A, the hammer arm 114 receives the stud 170 and is hit thereby toward the ribbon and paper. The hammer arm 114' has a sleeve or hub 112 and is pivoted at 168 on the shaft which carries the actuator plate. The reason a separate actuator and arm are used is so that the motion of the actuator may be arrested slightly before printing contact, while the hammer continues under its own inertia to strike the paper, and therefore can rebound slightly for clean print. This rebound is insured by a restoring spring 172, the rear end of which is connected to a stud 174 on the hammer arm, and the forward end of which is connected to a stud 176 (FIG. 2) on the actuator plate 166.

Reverting to FIGS. 3 and 4, the location of hammer solenoid 140 is adjustable by means of its mounting screws 178, and the travel of the solenoid core is thereby adjustable to move the actuator plate an amount slightly less than to the final position of the hammer, which, as above indicated, completes its stroke by inertia.

The motion of the hammer solenoid is transferred from arm 148 to spaced arm 152 to clear the pulley of solenoid 101. Arm 152 is bent or offset, as between its upper and lower ends, to properly locate its connection to link 162.

Reverting to FIG. 2–A, the hammer face 91 may be rockably mounted on a pivot held by a small pull spring 89, thus making the hammer face self-adjustable. Cushioning material is placed between parts 90 and 91. Block 90 is secured to the hammer arm 114' by means of a screw 115'.

The return movement of the hammer itself is limited by an adjustable stop screw 300 (FIG. 2). This is engaged by a finger projecting from the hub 112 of the hammer arm, as shown at 302 in FIG. 2–A. These parts are also visible in FIG. 3. There is an advantage in having a separate stop for the hammer arm in that its return movement is stopped sooner than the return movement of the actuator plate 166 by a small distance, say 1/32". This permits the stud 170 of the actuator plate to strike the hammer arm 114' somewhat percussively, which, together with the free movement of the hammer at the other end of the hammer stroke, results in better and cleaner printing.

The hammer may be provided with a third stop to limit its inward movement, and referring to FIG. 2, there is a horizontal stop screw 304 threadedly adjustable in a block 306 forming a part of the hammer arm. The adjustment of screw 304 is such that during the printing of characters it is inoperative, and in no way interferes with the hammer action. However, when there is a space, that is, when no character is being printed, the stop 304 prevents the hammer from hitting the ribbon and smudging the tape. As an alternative, the type cylinder may be provided with a square dot in lieu of a blank space, in which case the stop screw 304 and block 306 are omitted, and instead a square dot is printed at each blank space between words along the tape.

The hammer motion also operates the feed wheels. Referring to FIG. 9, one of the four feed wheels, preferably the wheel 92, is carried on a shaft 180 which projects rearward through a bearing 182. As its rear end it carries or is formed integrally with a crown-shaped ratchet wheel 184. This cooperates with a pawl 186 pivoted at 188 on a pawl arm 190 secured by screw 192 to shaft 168 of the hammer actuator plate. These parts are also shown, but to smaller scale, in FIGS. 3 and 4. The pawl idles on the hammer stroke, and steps the feed wheel ahead on the return stroke of the hammer.

To hold the feed wheels in position during the hammer stroke (that is, during the upward movement of pawl 186), a detent may be provided. This is shown in FIG. 10, in which a detent arm 194 is pivoted at 196 and is urged toward the teeth of ratchet wheel 184 by means of a pull spring 198. An eccentric at 196 affords position adjustment. The detent is located about diametrically opposite the pawl shown in FIG. 1. At its lower end the arm 194 has a tooth 206 which enters a tooth space and so fixes the position of the feed wheel against backward but not forward movement. From inspection of FIG. 2 it will be understood that the action of the feed pawl and detent on wheel 92 becomes effective for all four feed wheels, because they are all geared directly together.

The arms 96 which carry the pressure rollers 98 (FIGS. 2 and 8) are a part of a lever pivoted at 138, and at the opposite end and lever carries the forwardly projecting paper release button 30 previously referred to. The rollers are urged against the tape by means of a pull spring 266 connected at one end to the lever at stud 268, and at its other end to the frame at 270. Button 30 is carried on a front plate 272 which connects the top and bottom arms 96, and the paper tape passes from the guide channel 72 behind the front plate 272. There is sufficient clearance, as will be clear from FIG. 8, to afford inward pushing of button 30 and tilting of the lever to release the tape. There are additional paper guide rollers at 264.

The pressure rollers 132 (FIG. 2) for the ink tape are carried on a vertical pin 133 for self-adjusting seating. The rollers are moved inward by means of a compression spring bearing against the right end of lever 136. This will be seen in FIG. 4 of the drawing, in which compression spring 276 surrounds a rod 278 carrying a yoke 280 which bears against the end of lever 136. The resulting outward movement of the lever causes an inward movement at the opposite end which carries the pressure rollers 132. The vertical pivot pin 138 (FIG. 2) serves to pivot both the levers 136 and 96 for both sets of pressure rollers.

Some further miscellaneous details of the apparatus may be described next. In FIG. 2 there are lock handles 210 pivoted at 212 for turning sloping lock cams 214. The cylindrical case 12 (FIG. 1) and square flange 14 remain secured to the instrument panel when the printer is removed for servicing. For this purpose the handles 210 may be turned outward after the cover 18 has been swung open on its hinge 22, and thereupon the printer is free to slide forward. The generally circular front frame plate 158 is aligned with a rear frame plate 216 (FIGS. 3 and 4) and these, with their connecting ribs or tracks 218, 220, help position the printer properly in the cylindrical case. To orient the printer against rotation, the rib 218 is channeled as shown at 222 (FIG. 2), and the inside of the case has a guide track or bar secured thereto, as indicated by the line of rivets 224 in FIG. 1. At the opposite side 220 the frame is also channeled, but only to a slight depth to provide the paper guide groove 72 previously described.

Referring to FIGS. 11 and 12, the connection of the cable to posts 48 and 52 is adjustable by loosening the adjusting screw at the top, and rotating the cable connection slightly before again tightening the screw. This adjustment may be used for proper centering of the characters rotationally and axially.

The travel of the pulley is adjustable by means of lock nuts indicated at 226. The energized position is determined internally when the movable core 227 engages a fixed stop. When de-energized the movable core moves outward under influence of a compression spring. This outward movement is limited by adjustment of the lock nuts 226. Thus the lock nuts determine the travel of the solenoid, and may be used to accurately secure the desired increments of 1/16, 1/8, and 1/4 inch.

The cables are preferably made of woven Dacron strands. The pulley sheaves are preferably made of stainless steel. They are carried in pulley blocks or yokes 228 which are preferably made of one of the plastics in order to prevent heat transfer from the solenoid to the pulley, and also for light weight. For the same purposes a thin disc of aluminum 230 is secured at the rear of each of the blocks 228 to act as a heat reflector. The sheaves and other pulleys are preferably on ball bearings, when as here, the speed is to be brought up to say 150 words per minute.

It has already been mentioned that the cable passes which determine the effective shortening or lengthening of the cable should be kept exactly parallel. For this purpose a direction changing pulley 232 (FIG. 11) is used for cable 36 on its way to drum 50, and a direction changing pulley 234 (FIG. 12) is used on cable 42 on its way to the transfer pulley 54. Cable 46 is turned about a cornering pulley 236 before being connected to its return spring 238. This is done primarily so that the return spring may extend longitudinally of the printer and therefore may be of substantial length. The return spring 240 also extends longitudinally of the printer and may be of substantial length.

For an efficient magnetic circuit the solenoids preferably have ferrous metal around the outside of their windings. The forward solenoid 100 (FIGS. 3, 4, and 5) has this metal disposed at the top and bottom, as shown at 242. More height is available here where there is no paper roll. This solenoid is somewhat longer than solenoids 101 and 102 because it provides the maximum travel. Solenoids 101 and 102 are over the paper roll, and also are offset from the center of the printer, and therefore do not have as much height available when fitted inside a cylindrical casing. For this reason the external ferrous metal is disposed at the sides of the coil, as shown at 244, 246. Even so the ferrous metal is too high at the outside, and the outside corners are accordingly cut away, that is the metal is lower at 244 than at 246. This is illustrated in FIG. 13, where one corner is cut away at 245, and ferrous strap 244 is therefore lower than strap 246. Each of the four solenoids 101, 102, 104, and 105 has one corner cut away as here shown.

Referring to FIG. 5, the paper roll 70 is held by a retractable center rod 250. This may be pulled down by means of a handle 252 against a compression spring 254 for the insertion of a new roll of paper. For this purpose the printer first is slid forward out of its case, but this need be done only infrequently because of the large diameter of the paper roll, and the thin paper used. At this time a few drops of ink may be dropped on the ink wick 130 (FIG. 6).

Electrical connection to the printer is made through a multiprong detachable connector indicated at 260 in FIGS. 5, 6, and 7. One connection is needed for each of the seven solenoids. A common return connection may employ two pins instead of one because of the heavier current carried by the common return. In addition, there are spare pins for further connections which may be wanted for special purposes.

Referring to FIGS. 3 and 4, there is a standoff insulator 310 on the back plate 216 of the cast frame. This acts as an intermediate connection for the return wires of some of the solenoids, which are connected to standoff 310. A single connection then leads from the standoff to one of the pins of the connector 260. Similarly there are two insulated standoffs 312 and 314 for the bottom deck, best shown in FIGS. 4 and 6. These receive return conductors from the remaining solenoids, and a conductor from these standoffs leads to another connector pin of the connector 260. The individual input conductors for the different solenoids may extend directly from the connector 260 to the solenoids, the wires being bundled to form a suitable "harness," as shown at 320 in FIG 7.

It is believed that the construction and operation of my compact printer, as well as the advantages thereof, will be apparent from the foregoing detailed description. The printer is particularly small in transverse direction, and fits within an approximately three inch diameter cylinder. It employs narrow light-weight paper tape supplied from a large diameter roll, and fed by a feed means which pulls the tape across the printing mechanism. This feed means is itself nested compactly at the front end of the printer, and does not conceal the characters being printed, which instead are exposed all the way back to the hammer. There is no concealment by the ink ribbon because the latter extends transversely of the tape. Supply and take-up spools are eliminated, and yet a long ribbon is provided because it extends entirely around the printer. The ribbon is automatically re-inked, and the inking device carries no free fluid. The character selection and hammer action are provided by solenoids which extend longitudinally of the printer, and which are nested closely together to fit within the narrow cylinder. The cable return springs may be simple pull springs of considerable length, because they too are disposed longitudinally of the printer. Feed movement applied to one of four feed wheels turns all four, because they are geared directly together for rotation in proper direction.

It will be understood that while I have shown and described the invention in a preferred form, changes may be made in the structure shown without departing from the scope of the invention, as sought to be defined in the following claims.

I claim:

1. A compact telegraph printer which is elongated from front to back, said printer comprising a shaft extending across the front of the printer, a type cylinder rotatable with and movable axially on the shaft, a first cable to move the type cylinder axially on the shaft, a second cable to rotate the shaft, solenoids disposed longitudinally of the printer in the upper half of the printer, the solenoid cores carrying pulleys for one of said cables with alternate solenoids directed oppositely, and similarly arranged solenoids and pulleys in the lower part of the printer for the other cable.

2. A compact telegraph printer which is elongated from front to back, said printer comprising a shaft extending across the front of the printer, a type cylinder rotatable with and movable axially on the shaft, a first cable to move the type cylinder axially on the shaft, a second cable to rotate the shaft, solenoids disposed longitudinally of the printer in the upper half of the printer, the solenoid cores carrying pulleys for one of said cables with alternate solenoids directed oppositely, similarly arranged solenoids and pulleys in the lower part of the printer for the other cable, and a paper tape roll of substantial diameter disposed on a vertical axis between the upper and lower groups of solenoids.

3. A compact telegraph printer designed to fit in a relatively slender cylindrical case received in an instrument panel opening, said printer comprising a shaft extending diametrically across the front of the printer, a type cylinder rotatable with and movable axially on the shaft, a first cable to move the type cylinder axially on the shaft, a second cable to rotate the shaft, three solenoids disposed longitudinally of the printer in the upper half of the printer, the solenoid cores carrying pulleys for one of said cables with the middle solenoid directed oppositely to the other two, and three similarly arranged solenoids and pulleys in the lower part of the printer for the other cable.

4. A compact telegraph printer designed to fit in a relatively slender cylindrical case received in an instrument panel opening, said printer comprising a shaft extending diametrically across the front of the printer, a type cylinder rotatable with and movable axially of the shaft, a first cable to move the type cylinder axially on the shaft, a second cable to rotate the shaft, three solenoids disposed longitudinally of the printer in the upper half of the printer, the solenoid cores carrying pulleys for one of said cables with the middle solenoid directed oppositely to the other two, three similarly arranged solenoids and pulleys in the lower part of the printer for the other cable, and a paper tape roll of substantially maximum diameter disposed on a vertical axis between the upper and lower groups of solenoids.

5. A telegraph printer comprising first means at the front of the printer, and paper feed means to pull the paper tape horizontally across the print means, said feed means comprising two feed wheels geared together, said feed wheels having frictional face surfaces located immediately behind the tape, and pressure means bearing resiliently against the tape to urge the same into contact with the frictional face surfaces.

6. A telegraph printer comprising print means at the front of the printer for printing on the front of the tape, and paper feed means to pull the paper tape horizontally across the print means, said feed means comprising two feed wheels geared together, said feed wheels having frictional front face surfaces located immediately behind the tape, and pressure fingers carrying small rollers bearing resiliently against the upper and lower edges of the tape to urge the same into contact with the frictional face surfaces without concealing the characters printed on the front of the tape.

7. A compact telegraph printer which is elongated from front to back, said printer comprising print means at the front of the printer, paper feed means to pull the paper tape across the print means, said feed means comprising two feed wheels geared together, said feed wheels having frictional face surfaces located immediately behind the tape, pressure means bearing resiliently against the tape to urge the same into contact with the frictional face surfaces, said print means comprising a type body, an ink ribbon, a hammer, a solenoid and linkage disposed longitudinally of the printer to actuate the hammer, a ratchet wheel operatively connected to one of said feed wheels, and a pawl operatively connected to the hammer and actuated by the hammer to advance the ratchet and feed wheels.

8. A compact telegraph printer designed to fit in a relatively slender cylindrical case received in an instrument panel opening, said printer comprising a paper tape roll, print means at the front of the printer, paper feed means to pull the paper tape horizontally across the print means, said feed means comprising two feed wheels geared together, said feed wheels having frictional face surfaces located immediately behind the tape, pressure fingers carrying small rollers bearing resiliently against the upper and lower edges of the tape to urge the same into contact with the frictional face surfaces without concealing the characters printed on the front of the tape, said print means comprising a type body behind the tape, an ink ribbon disposed vertically in front of the tape, a rearwardly movable hammer in front of the ribbon, a solenoid and linkage disposed longitudinally of the printer to actuate the hammer, a ratchet wheel operatively connected to one of said feed wheels, and a pawl operatively connected to the hammer and operated by the return stroke of the hammer to advance the ratchet and feed wheels.

9. A compact telegraph printer designed to fit in a relatively slender cylindrical case received in an instrument panel opening, said printer comprising print means including a type body and a hammer at the front of the printer, an ink ribbon disposed vertically in a position to be struck by the hammer, and means to feed the ribbon, said ribbon being an endless band passing entirely around the printer from front to back, a takeup roller to keep the ribbon taut, and re-inking means including an ink saturated wick together with means to transfer ink from the wick to the ribbon.

10. A telegraph printer comprising print means including an ink ribbon, and means to feed the ribbon, said means comprising two feed wheels geared together and having frictional material on their faces to engage the ribbon, and pressure means bearing resiliently against the ribbon to hold the same against the frictional material of the face feed wheels.

11. A telegraph printer comprising print means including a type body and a hammer at the front of the printer, an ink ribbon disposed in a position to be struck by the hammer, and means to feed the ribbon, said means comprising two feed wheels geared together and having frictional material on their forward faces to engage the ribbon, a ratchet wheel operatively connected on the feed wheels, a pawl operatively connected to the hammer and actuated on the return stroke of the hammer to advance said ratchet and feed wheels, and pressure means bearing resiliently against the ribbon to hold the same against the frictional material of the feed wheels.

12. A telegraph printer comprising print means including a type body and a hammer at the front of the printer, an ink ribbon disposed in a position to be struck by the hammer, and means to feed the ribbon, said means comprising two feed wheels geared together and having frictional material on their forward faces to engage the ribbon, a ratchet wheel operatively connected to the feed wheels, a pawl operatively connected to the hammer and actuated on the return stroke of the hammer to advance said ratchet and feed wheels, pressure means bearing resiliently against the ribbon to hold the same against the frictional material of the feed wheels, said ribbon being an endless band passing entirely around the printer from front to back, a takeup roller to keep the ribbon taut, and re-inking means bearing against the ribbon.

13. A compact telegraph printer designed to fit in a relatively slender cylindrical case received in an instrument panel opening, said printer comprising print means including a type body and a hammer at the front of the printer, an ink ribbon disposed in a position to be struck by the hammer, and means to feed the ribbon, said means comprising two feed wheels geared together and having frictional material on their forward faces to engage the ribbon, a solenoid and linkage disposed longitudinally of the printer to actuate the hammer, a ratchet wheel operatively connected to the feed wheels, a pawl operatively connected to the hammer and actuated on the return stroke of the hammer to advance said ratchet and feed wheels, and pressure rollers bearing resiliently against the ribbon to hold the same against the frictional material of the feed wheels.

14. A compact telegraph printer designed to fit in a relatively slender cylindrical case received in an instrument panel opening, said printer comprising print means including a type body and a hammer at the front of the printer, an ink ribbon disposed in a position to be struck by the hammer, and means to feed the ribbon, said means comprising two feed wheels geared together and having frictional material on their forward faces to engage the ribbon, a solenoid and linkage disposed longitudinally of the printer to actuate the hammer, a ratchet wheel operatively connected to the feed wheels, a pawl operatively connected to the hammer and actuated on the return stroke of the hammer to advance said ratchet and feed wheels, pressure rollers bearing resiliently against the ribbon to hold the same against the frictional material of the feed wheels, said ribbon being an endless band passing entirely around the printer from front to back, a takeup roller to keep the ribbon taut, and re-inking means including an ink saturated wick and means to transfer ink from the wick to the ribbon.

15. A telegraph printer comprising means to hold a paper tape roll, print means at the front of the printer, paper feed means to pull the tape from the tape roll across the print means, an ink ribbon, means to feed the ribbon, said paper feed means and said ribbon feed means each comprising two feed wheels geared together and having frictional face surfaces located immediately behind the tape and ribbon, said tape feed wheels and ribbon feed wheels being geared to one another for simultaneous rotation of all four wheels, pressure means bearing resiliently against the tape and ribbon to hold the same against the frictional material of the feed wheels, and drive means connected to one of the feed wheels.

16. A telegraph printer comprising means to hold a paper tape roll, print means at the front of the printer including a type body and a hammer, paper feed means to pull the tape from the tape roll across the print means, an ink ribbon disposed in a position to be struck by the hammer, means to feed the ribbon, said paper feed means and said ribbon feed means each comprising two feed wheels geared together and having frictional face surfaces located immediately behind the tape and ribbon, said tape feed wheels and ribbon feed wheels being geared to one another for simultaneous rotation of all four wheels, pressure means bearing resiliently against the tape and ribbon to hold the same against the frictional material of the feed wheels, a ratchet wheel operatively connected to one of said feed wheels and a pawl operatively connected to the hammer and actuated by the hammer to advance the ratchet and feed wheels.

17. A compact telegraph printer which is elongated from front to back, said printer comprising means to hold a paper tape roll, print means at the front end of the printer including a type body and a hammer, paper feed means to pull the tape from the roll horizontally across the print means, an ink ribbon disposed vertically in a position to be struck by the hammer, means to feed the ribbon, said paper feed means and said ribbon feed means each comprising two feed wheels geared together and having frictional face surfaces located immediately behind the tape and ribbon, said tape feed wheels and ribbon feed wheels being geared to one another for simultaneous rotation of all four wheels, pressure fingers carrying small rollers bearing resiliently against the tape and ribbon to hold the same against the frictional material of the feed wheels, a solenoid and linkage disposed longitudinally of the printer to actuate the hammer, a ratchet wheel operatively connected to a feed wheel, and a pawl operatively connected to the hammer and actuated by the return stroke of the hammer to advance the ratchet and feed wheels.

18. A compact telegraph printer designed to fit in a relatively slender cylindrical case received in an instrument panel opening, said printer comprising means to hold a paper tape roll, print means at the front of the printer including a type body and a hammer, paper feed means to pull the tape from the roll horizontally across the print means, an ink ribbon disposed vertically in a position to be struck by the hammer, means to feed the ribbon, said paper feed means and said ribbon feed means each comprising two feed wheels geared together and having frictional face surfaces located immediately behind the tape and ribbon, said tape feed wheels and ribbon feed wheels being geared to one another for simultaneous rotation of all four wheels, pressure fingers carrying small rollers bearing resiliently against the edges of the tape and ribbon to hold the same against the frictional material of the feed wheels, a solenoid and linkage disposed longitudinally of the printer to actuate the hammer, a ratchet wheel operatively connected to a feed wheel, a pawl operatively connected to the hammer and actuated by the return stroke of the hammer to advance the ratchet and feed wheels, said ribbon being an endless band passing entirely around the printer from front to back, a takeup roller to keep the ribbon taut, and re-inking means engaging the ribbon.

19. A compact telegraph printer which is elongated from front to back, said printer comprising a shaft extending across the front of the printer, a type cylinder rotatable with and movable axially on the shaft, a first cable to move the type cylinder axially on the shaft, a second cable to rotate the shaft, solenoids disposed longitudinally of the printer in the upper half of the printer, the solenoid cores carrying pulleys for one of said cables with the alternate solenoids directed oppositely, similarly arranged solenoids and pulleys in the lower part of the printer for the other cable, and two relatively long pull springs disposed longitudinally of the printer, one each acting as a return spring for each of the cables.

20. A compact telegraph printer which is elongated from front to back, print means at the front of the printer, paper feed means to pull a paper tape across the print means, said feed means comprising two feed wheels geared together, said feed wheels having frictional face surfaces located immediately behind the tape, pressure means bearing resiliently against the tape to urge the same into contact with the frictional face surfaces, said print means comprising a type body, an ink ribbon, a hammer, a solenoid and linkage disposed longitudinally of the printer to actuate the hammer, a ratchet wheel operatively connected to one of said feed wheels, a pawl operatively connected to the hammer and operated by the hammer to advance the ratchet and feed wheels, and a relatively long pull spring disposed longitudinally of the printer and acting as a return spring for the hammer linkage.

21. A compact telegraph printer which is elongated from front to back, said printer comprising a shaft extending across the front of the printer, a type cylinder rotatable with and movable axially on the shaft, a first cable to move the type cylinder axially on the shaft, a second cable to rotate the shaft, solenoids disposed longitudinally of the printer in the upper half of the printer, the solenoid cores carrying pulleys for one of said cables with alternate solenoids directed oppositely, similarly arranged solenoids and pulleys in the lower part of the printer for the other cable, a print hammer, and a solenoid and linkage disposed longitudinally of the printer to actuate the hammer.

22. A compact telegraph printer which is elongated from front to back, said printer comprising a shaft extending across the front of the printer a type cylinder rotatable with and movable axially on the shaft, a first cable to move the type cylinder axially on the shaft, a second cable to rotate the shaft, solenoids disposed longitudinally of the printer in the upper half of the printer, the solenoid cores carrying pulleys for one of said cables with alternate solenoids directed oppositely, similarly arranged solenoids and pulleys in the lower part of the printer for the other cable, a print hammer, a solenoid and linkage disposed longitudinally of the printer to actuate the hammer, and three relatively long pull springs disposed longitudinally of the printer, one acting as a return spring for the hammer linkage, and the other two acting one each as a return spring for each of the cables.

23. A compact telegraph printer designed to fit in a relatively slender cylindrical case received in an instrument panel opening, said printer comprising print means including a type body and a hammer at the front of the printer, means to feed a paper tape across the front end of the printer, an ink ribbon disposed in operative position, a solenoid and linkage extending longitudinally of the printer to actuate the hammer, and a long pull spring extending longitudinally of the printer and acting as a return spring for the hammer linkage.

24. A compact telegraph printer designed to fit in a relatively slender cylindrical case received in an instrument panel opening, said printer comprising a type body, a cable to move the same for character selection, a plurality of solenoids disposed longitudinally of the printer, the solenoid cores carrying pulleys for said cable with the alternate solenoids directed in opposite directions, means to mount a paper tape roll having a diameter substantially equal to the diameter of the printer, and means to feed the tape across the front end of the printer at the type body.

References Cited in the file of this patent

UNITED STATES PATENTS

| | | |
|---|---|---|
| 1,800,195 | Porter | Apr. 7, 1931 |
| 2,189,927 | Salmon | Feb. 13, 1940 |
| 2,603,343 | Payne | July 15, 1942 |
| 2,742,532 | Durkee | Apr. 17, 1956 |